July 2, 1940.　　　W. P. YANT　　　2,206,684

FILTER ELEMENT

Filed April 26, 1938

WITNESSES
A. B. Wallace
V. A. Peckham

INVENTOR.
William P. Yant
BY Brown, Critchlow & Hick
his ATTORNEYS.

Patented July 2, 1940

2,206,684

UNITED STATES PATENT OFFICE 2,206,684

FILTER ELEMENT

William P. Yant, Pittsburgh, Pa., assignor to Mine Safety Appliances Company, Pittsburgh, Pa., a corporation of Pennsylvania Application April 26, 1938, Serial No. 204,339

3 Claims. (Cl. 183—71)

This invention relates to the purifying of air, and more particularly to a filter element especially suitable for respirators and the like.

It is among the objects of this invention to provide an air-filtering element which has a relatively large effective area compared with its over-all dimensions, which is extremely compact, and which is very inexpensive and simple in construction but dependable and effective in operation.

Figure 1:
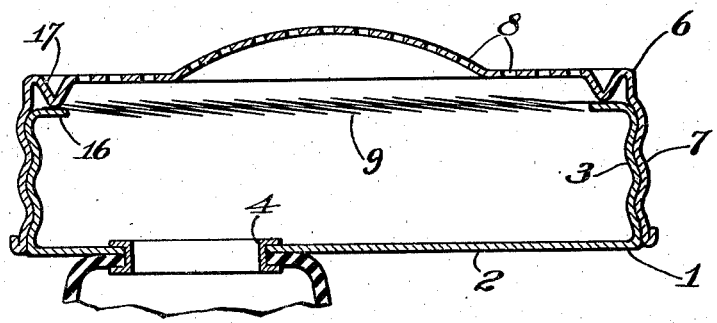
Figure 2:
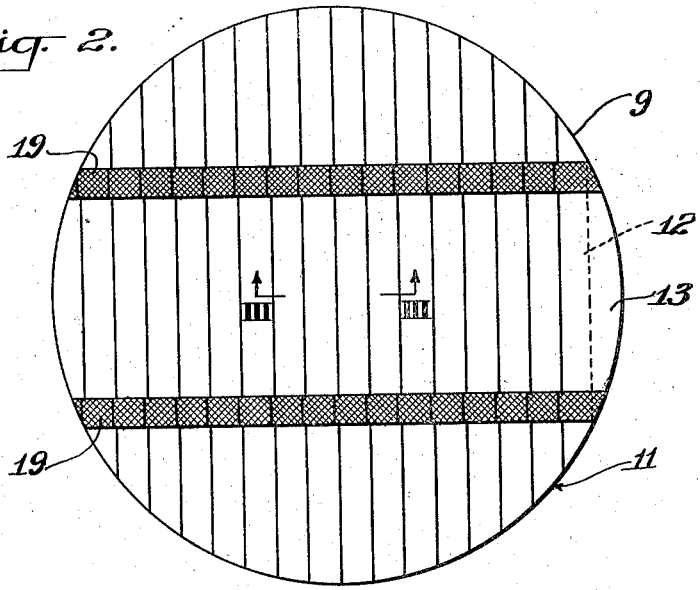
Figure 3:
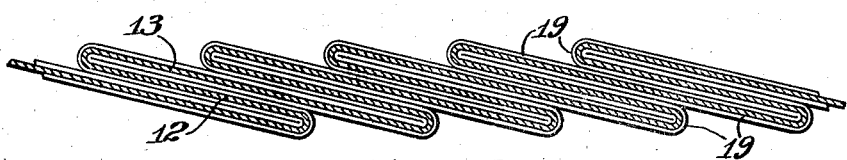

The preferred embodiment of the invention is illustrated in the accompanying drawing in which Fig. 1 is a section through an air-purifying unit; Fig. 2 is a plan view of the filter element of the unit; and Fig. 3 is an enlarged fragmentary section of the filter element taken on line III—III of Fig. 2.

Although this invention can be used wherever it is desirable to filter air, it is particularly applicable to canisters of the general type disclosed in United States Patent No. 2,019,928, granted to Charles W. Punton, and will therefore be described, by way of exemplification, with reference to such canisters. Those canisters generally comprise a casing provided with an outlet for purified air, and a cover provided with openings for the ingress of unpurified air. The cover and casing are formed in such a manner as to be adapted to clamp a sheet-like filter element between them in the path of the air passing through the canister.

In accordance with this invention, harmful constituents of gas or vapor, or particulate matter such as toxic dusts and other harmful solids and liquid mists, are removed from air to render it fit for breathing by a filter element having an effective area materially in excess of common practice in canisters of the type just referred to, whereby to materially increase the capacity of the filter. When such a filter is used with a respirator, it allows sufficient air to pass through it for substantially unrestricted breathing, thus avoiding the discomfort and dangers of high breathing resistance. Likewise, the area of the filter element is so great that breathing resistance remains adequately low even though the pores in the element become partly clogged by particulate matter filtered out of the air passing through the filter. The filter element is so compact that it requires no larger canister than previously used with a flat filter sheet.

Referring to Fig. 1 of the drawing, a casing 1, which is preferably cylindrical, is provided with a circular base 2 and an upstanding side wall 3. The base is provided with an outlet opening adapted to be connected by a coupling 4 to the apparatus, such as breathing apparatus, which requires purified air. The open end of the casing is normally closed by a removable cover 6 provided with a depending skirt 7 for receiving the side wall of the casing to which it is preferably threadably connected. The top of the cover is provided with a plurality of openings 8 for the admission of impure air. Disposed in the canister thus formed and in the path of all of the air passing therethrough is a filter element 9.

It is a feature of this invention that the effective area of my filter element is materially greater than the cross-sectional area of the inside of the canister so that the amount of air that can pass through the element per unit of time is greatly increased. Accordingly, the filter element is formed from a relatively large sheet of fibrous filter material which is folded to provide a series of reverse folds 11. As shown in Fig. 3, the sheet is folded in such a manner that one layer 12 of each fold is narrower than the other layer 13 so that when the folds are disposed in overlapping relation they only partially overlap one another. Because of this, each fold adds to the width of the element instead of merely increasing the thickness of a stack of superimposed folds. The filter element may be conveniently formed to fit in the cylindrical canister described herein by folding a rectangular sheet of filter material in the manner just described, and then, with the folds lying substantially flat in partially overlapping relation, cutting a circular portion out of the sheet, as shown in Fig. 2. If the canister is of a shape other than circular, a filter element of a corresponding shape can be formed in the same manner.

The canister filter element thus formed is preferably held in the canister by clamping it therein around its edges. This may conveniently be done, as shown in Fig. 1, by providing the upstanding wall 3 of the casing with an inwardly extending flange 16, and by providing the top of the cover with a downwardly projecting annular bead 17 that overlies flange 16. The edge of the filter element is tightly clamped between this bead and flange by screwing the cover tightly onto the casing so that leakage of impure air can not occur between the filter element and canister.

It is another feature of this invention that the overlapping layers of the folds of this filter element are prevented from engaging each other face to face and thereby decreasing the effective area of the element and increasing its thickness. This is done by spacing means disposed between the fold layers, preferably by a plurality of substantially parallel narrow tapes 19 which, if flexible, may be secured to each side of the filter sheet before it is folded (Fig. 2). When the sheet is folded, these tapes become disposed between the layers of the folds, as shown in Fig. 3, and form spacing elements that hold the layers a slight distance apart to permit impure air to enter between them and filter through substantially the entire surface area of the filter element. If the tapes are rigid or semi-rigid they may be inserted between the layers of the folded sheet either before or after it has been clamped in the canister.

While various sheet-like filtering elements may be used, it is preferred to use a porous cellulosic material in sheet form and of such porosity as to satisfactorily remove particles of dust of the size encountered in use. That is, for coarse dusts there may be used a cellulosic material sheet whose pores are coarser than those of a paper used in a respirator for fine particles, such as those of smokes. Most suitably the filter element is formed from cellulose fiber sheet treated to provide pore openings of critical size. Such critical pore size is obtainable by impregnating the pores of foraminous material, suitably cellulosic sheets, with finely divided substances which clog the larger pores to provide a filter the pores of which will prevent passage of particles to be filtered out, i. e., to provide critical pore size.

A filter element made in accordance with this invention is relatively small and compact, but has an effective area equal to that of a much larger and more bulky filter. Due to its small size it requires only a small and compact canister or the like to house it. The filter itself is not only simple and inexpensive, but an air-purifying unit made with it may also be readily and inexpensively formed.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. A substantially flat air-purifying element comprising a sheet of filter material provided with a series of reverse folds, one layer of each fold being narrower than its other layer whereby said folds only partially overlap one another, and a thin reverse folded tape secured to said sheet and extending transversely of said folds to space them apart.

2. A substantially flat air-purifying element comprising a sheet of filter material provided with a series of reverse folds, one layer of each fold being narrower than its other layer whereby said folds only partially overlap one another, and a plurality of substantially parallel reverse folded tapes secured to said sheet and extending transversely of said folds to space them apart.

3. A substantially flat air-purifying element comprising a sheet of filter material provided with a series of reverse folds, one layer of each fold being narrower than its other layer whereby said folds only partially overlap one another, said folds lying in close proximity to one another, and a tape folded in the same manner as said sheet and mounted on each side thereof, the tape folds being disposed between the sheet folds.

WILLIAM P. YANT.